UNITED STATES PATENT OFFICE.

RALPH H. McKEE, OF ORONO, MAINE, ASSIGNOR TO NEW PROCESS GASOLINE CO., OF PHILADELPHIA, PENNSYLVANIA, A CORPORATION OF DELAWARE.

PROCESS OF PRODUCING TOLUENE.

1,244,444.  Specification of Letters Patent.  Patented Oct. 23, 1917.

No Drawing.  Application filed January 18, 1916.  Serial No. 72,746.

*To all whom it may concern:*

Be it known that I, RALPH H. MCKEE, a citizen of the United States, residing at Orono, in the county of Penobscot and State of Maine, have invented certain new and useful Improvements in Processes of Producing Toluene, of which the following is a specification.

This invention relates to the production of toluene, and has particular reference to a process of producing toluene and propane from what is commonly known as "spruce turpentine," a waste product resulting from the manufacture of cellulose or fibers from spruce and similar woods such as balsam and fir by boiling it under pressure in suitable digesters with a solution containing sulfurous acid and a base or bases, such as lime or lime and magnesia, according to what is known as the "sulfite process."

In the treatment of spruce wood by the sulfite process gases and vapors consisting principally or largely of sulfur dioxid pass from the digesters in which the wood is subjected to the action of the sulfite solution, to containers usually in the form of separating funnels, containing an acid solution of calcium bisulfite through which the gases and vapors are caused to bubble or the spruce turpentine may be secured by any other method of condensation from the gases escaping from the digesters. The crude spruce turpentine collects on the surface of the acid liquor and may be readily drawn off therefrom. The crude material as drawn off from the acid liquor contains as impurities sulfur dioxid gas and tarry matters which it is important to remove therefrom.

In the practice of my process in its preferred embodiment, the spruce turpentine is first separated from the sulfur dioxid gas and tarry products with which it is associated. This purification is preferably effected by distilling the crude turpentine in the presence of steam, the distillation being preferably continued until from approximately 80 per cent. to 90 per cent. of the original liquid is obtained as a distillate. A single distillation ordinarily produces a product of sufficient purity for use in producing substantially pure toluene according to my process, but a second distillation may be resorted to if the product is found to be insufficiently freed from the undesired materials mentioned.

The product resulting from the distillation is then subjected to treatment to remove water therefrom. This drying operation may be advantageously effected by passing the liquid over or preferably through a mass of calcium chlorid, or other drying agent, in a relatively finely divided condition. I prefer, however, to effect the drying operation by heating or distilling the turpentine until about 2 per cent. of such product has been removed by vaporization.

The product, thus substantially freed from the impurities referred to and water, is ready for further treatment in accordance with my process. In this treatment I add aluminum chlorid to the product, purified as hereinbefore set forth, and distil the liquid. The aluminum chlorid is added in such quantity as is found to be most suitable for the particular material under treatment. I prefer, however, to employ approximately 5 per cent. by weight, of aluminum chlorid, and satisfactory results have been obtained by the employment of the aluminum chlorid in this proportion. I have found, however, that the proportion of aluminum chlorid may be materially increased or diminished without seriously interfering with the satisfactory operation of the process.

The distillation may be conducted at or above or below atmospheric pressure, but I prefer to conduct the distillation at or only slightly above atmospheric pressure.

Heating the spruce turpentine with aluminum chlorid effects a decomposition of the turpentine, the principal products of the reaction being toluene and propane. The toluene is condensed in the distillate and the gaseous propane conducted to a place of use or storage.

I have found that an increased yield of toluene and propane may be obtained from the distillation of the material in the presence of aluminum chlorid, by passing a stream of hydrochloric acid gas through the liquid while it is being distilled. The rate of flow of the hydrochloric acid gas passed into the material during the distillation process, is not of importance, a slow stream of the gas being sufficient to materially increase the yield of toluene.

From my experiments it appears that the aluminum chlorid acts catalytically, and the process can therefore be continued for considerable periods without renewing the supply of aluminum chlorid, additional quantities of the material under treatment being added to the still continuously or intermittently as desired, during the distillation process.

I have found that, in the practice of my process, the activity of the aluminum chlorid is gradually lessened. The aluminum chlorid may, however, be separated from the liquid residue in the still and may be regenerated and made suitable for further use in the process.

The distillate consists chiefly or largely of a mixture of the material employed, and toluene, the distillate ordinarily containing from 60 per cent. to 70 per cent. of toluene. A subsequent distillation of the product with aluminum chlorid, preferably in the presence of a slow stream of hydrochloric acid gas, increases the yield of toluene. The toluene may be separated from the spruce turpentine in any desired manner, preferably by fractional distillation.

While I have described the preferred practice of my process and the proportions of reagents and materials which I employ, it is to be understood that the details of procedure and the proportions of materials may be widely varied, and that chemical equivalents of the reagents may be used, without departure from the spirit of my invention or the scope of the subjoined claims.

Having described my invention, I claim:

1. The herein described process, which consists in heating spruce turpentine and aluminum chlorid to a reacting temperature whereby toluene is produced.

2. The process of producing toluene and propane which consists in heating spruce turpentine in the presence of aluminum chlorid and separating the toluene and propane formed from the other materials present.

3. The process of producing toluene which consists in heating spruce turpentine in the presence of aluminum chlorid and hydrochloric acid and separating the toluene from the other materials present.

4. The process of producing toluene which consists in adding aluminum chlorid to spruce turpentine, subjecting the liquid to distillation, and separating the toluene from the remainder of the distillate.

5. The process of producing toluene which consists in adding aluminum chlorid to spruce turpentine, subjecting the liquid to distillation in the presence of hydrochloric acid gas and separating the toluene from the other materials present in the distillate.

6. The process of producing toluene which consists in freeing spruce turpentine from sulfur dioxid gas and tarry matters, heating it in the presence of aluminum chlorid and separating the toluene from the other materials present.

7. The process of producing toluene which consists in freeing spruce turpentine from sulfur dioxid gas and tarry matters, removing water therefrom, heating it in the presence of aluminum chlorid and separating the toluene from the other materials present.

8. The process of producing toluene and propane which consists in freeing spruce turpentine from sulfur dioxid gas, tarry matters and water, adding aluminum chlorid thereto, subjecting the liquid to distillation while passing a current of hydrochloric acid gas therethrough and separating the toluene and propane from the other materials present in the distillate.

9. The process of producing toluene which consists in distilling spruce turpentine in the presence of steam, adding aluminum chlorid to the distillate, distilling the liquid and separating toluene from the other materials present in the distillate.

10. The process of producing toluene and propane which consists in distilling spruce turpentine in the presence of steam, drying the distillate, adding aluminum chlorid thereto, distilling the liquid in the presence of hydrochloric acid gas and separating toluene and propane from the other materials present in the distillate.

11. The herein described process which consists in heating spruce turpentine with aluminum chlorid, separating toluene from the other products of the reaction, and separating the aluminum chlorid from the liquid residue.

12. The herein described process which consists in adding aluminum chlorid to spruce turpentine, subjecting the treated liquid to distillation and separating the aluminum chlorid from the liquid residue in the still.

In testimony whereof I affix my signature in presence of two witnesses.

RALPH H. McKEE.

Witnesses:
CHARLES HAROLD RING,
CHARLES P. NICHOLS.